(12) United States Patent
Chou

(10) Patent No.: US 8,473,113 B2
(45) Date of Patent: Jun. 25, 2013

(54) ON-LINE COMPENSATION APPARATUS FOR FEEDBACK POSITIONS OF ENCODER AND METHOD FOR OPERATING THE SAME

(75) Inventor: Chia-Chih Chou, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 356 days.

(21) Appl. No.: 12/844,561

(22) Filed: Jul. 27, 2010

(65) Prior Publication Data

US 2012/0029726 A1 Feb. 2, 2012

(51) Int. Cl.
 *G05D 1/02* (2006.01)
(52) U.S. Cl.
 USPC ............. 700/302; 700/45; 370/390; 340/443
(58) Field of Classification Search
 USPC .......... 700/45, 71, 83, 302; 340/443; 370/390
 See application file for complete search history.

(56) References Cited

U.S. PATENT DOCUMENTS

| | | | |
|---|---|---|---|
| 5,903,454 A * | 5/1999 | Hoffberg et al. | 700/83 |
| 6,400,996 B1 * | 6/2002 | Hoffberg et al. | 700/83 |
| 7,136,710 B1 * | 11/2006 | Hoffberg et al. | 700/83 |
| 2001/0009547 A1 * | 7/2001 | Jinzaki et al. | 370/390 |
| 2003/0038552 A1 * | 2/2003 | Setiawan et al. | 310/90.5 |
| 2004/0130442 A1 * | 7/2004 | Breed et al. | 340/443 |

* cited by examiner

*Primary Examiner* — Mohammad Ali
*Assistant Examiner* — Anthony Whittington
(74) *Attorney, Agent, or Firm* — Muncy, Geissler, Olds & Lowe, PLLC

(57) ABSTRACT

An on-line compensation apparatus for feedback positions of an encoder and method for operating the same are applied to a motor driven to rotate at a constant speed by a driver, thus compensating the errors of feedback positions of the encoder. First, a compensation quantity calculation unit is used to calculate the compensation quantity of feedback positions of the encoder. Afterward, a position interval judgment unit is used to determine the position interval of the compensation quantity. Finally, a compensation quantity modification unit is used to modify the compensation quantity by using different weightings. Therefore, the compensation quantity is modified by an iteration calculation to achieve that an error between the feedback position and an ideal position is in an acceptable region, thus increasing accuracy of the feedback position compensation of the encoder.

10 Claims, 6 Drawing Sheets

ON-LINE COMPENSATION APPARATUS FOR FEEDBACK POSITIONS OF ENCODER AND METHOD FOR OPERATING THE SAME

BACKGROUND OF THE INVENTION

1. Field of the Invention

The present invention relates to a compensation apparatus for feedback positions of an encoder and a method for operating the same, and more particularly to an on-line compensation apparatus for feedback positions of an encoder and a method for operating the same.

2. Description of Prior Art

With the development of science and technology, the precision, high-speed, high-resolution, and high-bandwidth systems are considered as major objectives in modern industries. The speed or position control is required for many products and equipment with motors, such as optical disk drivers, printers, X-Y platforms, robot arms, semiconductor processing equipment, and so on. Once the speed and position can be accurately controlled, the large improvement in performance can be attained. Accordingly, the accurate control is more and more important in modern science and technology.

In the servo control system, the position and speed control are implemented by feeding back the position and speed information of the motor to the driver. The high-resolution position and speed feedback signals are required to achieve the accurate position and speed control, namely, a high-resolution encoder is required.

The magnitude of the sensed signal will be varied with the rotating speed of the motor, that is, the magnitude of the sensed signal is larger when the motor rotates more slowly, and vice versa. Accordingly, the existing high-resolution encoder uses an interpolation technology to the analog A and B pulse signals with sine and cosine components. Because the orthogonal property between the phase difference of the A and B pulse signals, the mutual leading or lagging condition between the A and B pulse can be used to determine that the motor rotates in forward or in reverse, thus obtaining an absolute position at any time. In addition, the sinusoid-wave encoder has a higher position resolution than the conventional square-wave encoder. However, the A and B pulse would be influenced to produce errors due to the light-emitting or light-receiving elements, the installation of the rotating elements, or the abnormal temperature variation for long-time use. Hence, the errors of magnitude, phase, and center level of the A and B pulse tend to occur so that the calculated interpolation position will be non-ideal (including the relative position errors) to cause worse position detection.

Accordingly, it is desirable to provide an on-line compensation apparatus for feedback positions of an encoder and a method for operating the same that are applied to a motor driven to rotate at a constant speed by a driver, thus compensating the errors of feedback positions of the encoder.

SUMMARY OF THE INVENTION

In order to solve the above-mentioned problems, the present invention provides an on-line compensation apparatus for feedback positions of an encoder, the on-line compensation apparatus is applied to a motor driven to rotate at a constant speed by a driver, thus compensating the errors of feedback positions of the encoder.

The on-line compensation apparatus includes a compensation quantity calculation unit, a position interval judgment unit, and a compensation quantity modification unit.

The compensation quantity calculation unit includes a first arithmetic unit and a second arithmetic unit. The first arithmetic unit receives a pre-treating compensation quantity and a pulse increment to sum up the pre-treating compensation quantity and the pulse increment. The second arithmetic unit is connected to the first arithmetic unit and receives an encoding pulse to subtract the encoding pulse from the sum of the pre-treating compensation quantity and the pulse increment, thus producing an interval compensation quantity.

The position interval judgment unit is connected to the compensation quantity calculation unit and receives the interval compensation quantity to judge the position interval of the interval compensation quantity according to the resolution of feedback positions of the encoder.

The compensation quantity modification unit is connected to the position interval judgment unit, and the compensation quantity modification unit includes a third arithmetic unit, a fourth arithmetic unit, a fifth arithmetic unit, a sixth arithmetic unit, and a seventh arithmetic unit. The third arithmetic unit receives a first compensation quantity, a second compensation quantity, and a weighting to multiply the first compensation quantity and the second compensation quantity by the weighting to produce a first weighting compensation quantity and a second weighting compensation quantity, respectively. The fourth arithmetic unit receives the weighting and a value of 100% to subtract the weighting from the value of 100%, thus producing an auxiliary weighting. The fifth arithmetic unit is connected to the fourth arithmetic unit and receiving the auxiliary weighting and a feedback compensation quantity of a position interval between the first compensation quantity and the second compensation quantity to multiply the feedback compensation quantity by the auxiliary weighting to produce a feedback weighing compensation quantity. The sixth arithmetic unit is connected the third arithmetic unit and the fifth arithmetic unit and receives the first weighting compensation quantity, the second weighing compensation quantity, and the feedback weighting compensation quantity to sum up the first weighting compensation quantity and the feedback weighting compensation quantity to produce a first compositing compensation quantity, and to sum up the second weighting compensation quantity and the feedback weighting compensation quantity to produce a second compositing compensation quantity. The seventh arithmetic unit is connected to the sixth arithmetic unit and receives the first compositing compensation quantity, the second compositing compensation quantity, and an initial compensation quantity to subtract the initial compensation quantity from the first compositing compensation quantity to produce a first modification compensation quantity, and to subtract the initial compensation quantity from the second compositing compensation quantity to produce a second modification compensation quantity.

Therefore, the compensation quantity is modified by an iteration calculation to achieve that an error between the feedback position and an ideal position is in an acceptable region, thus increasing accuracy of the feedback position compensation of the encoder.

In order to solve the above-mentioned problems, the present invention provides an on-line compensation method for feedback positions of an encoder, the method is applied to a motor driven to rotate at a constant speed by a driver, thus compensating the errors of feedback positions of the encoder.

Steps of the early-warning method are described as follows: First, a practical feedback pulse is obtained according to the feedback positions of the encoder. Afterward, a feedback compensation quantity is calculated by comparing the practical feedback pulse and an ideal feedback pulse. Afterward, a position interval of the feedback compensation quantity is judged. Finally, the feedback compensation quantity is modified by using different weightings.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
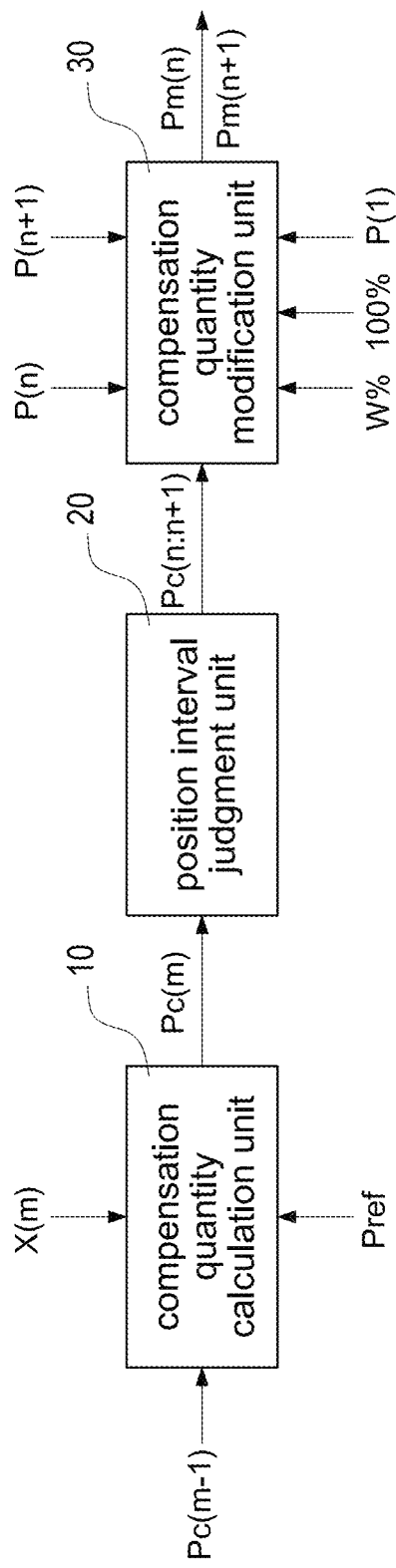
FIG. 1 is a block schematic view of an on-line compensation apparatus for feedback positions of an encoder according to the present invention.

Reference will now be made to the drawing figures to describe the present invention in detail.

Reference is made to FIG. 1 which is a block schematic view of an on-line compensation apparatus for feedback positions of an encoder according to the present invention. An on-line compensation apparatus for feedback positions of an encoder is applied to a motor driven to rotate at a constant speed by a driver, thus compensating the errors of feedback positions of the encoder. The on-line compensation apparatus includes a compensation quantity calculation unit 10, a position interval judgment unit 20, and a compensation quantity modification unit 30. The position interval judgment unit 20 is connected to the compensation quantity calculation unit 10, and the compensation quantity modification unit 30 is connected to the position interval judgment unit 20.

Figure 2A:
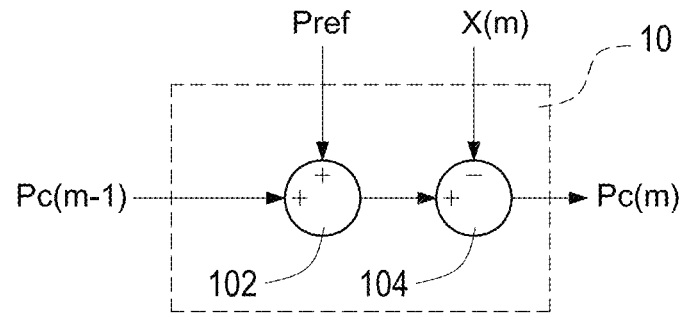
FIG. 2A is a block schematic view of a compensation quantity calculation unit.

Reference is made to FIG. 2A which is a block schematic view of a compensation quantity calculation unit. The compensation quantity calculation unit 10 includes a first arithmetic unit 102 and a second arithmetic unit 104. The first arithmetic unit 102 and the second arithmetic unit 104 are an addition/subtraction arithmetic unit, respectively. The first arithmetic unit 102 receives a pre-treating compensation quantity $Pc(m-1)$ and a pulse increment Pref to sum up the pre-treating compensation quantity $Pc(m-1)$ and the pulse increment Pref. The second arithmetic unit 104 is connected to the first arithmetic unit 102 and receives an encoding pulse $X(m)$ to subtract the encoding pulse $X(m)$ from the sum of the pre-treating compensation quantity $Pc(m-1)$ and the pulse increment Pref, thus producing an interval compensation quantity $Pc(m)$. In particular, the encoding pulse $X(m)$ is a position compensation quantity which is produced by the encoder at the corresponding time interval. The detailed description of the compensation quantity calculation unit 10 will be made hereinafter.

Figure 2B:
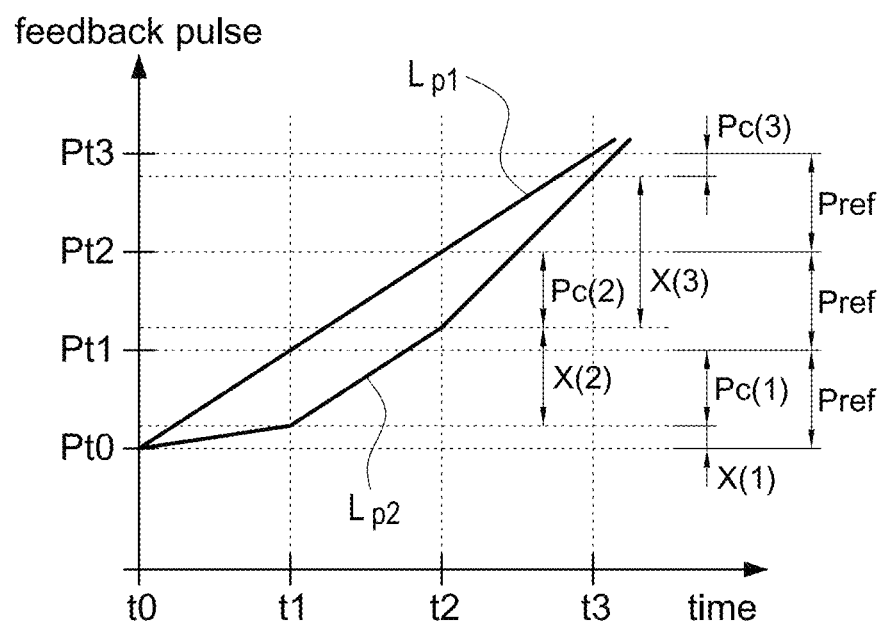
FIG. 2B is a curve chart of calculating the compensation quantity by the compensation quantity calculation unit.

Reference is made to FIG. 2B which is a curve chart of calculating the compensation quantity by the compensation quantity calculation unit. In this embodiment, three feedback positions and the corresponding compensation quantities are exemplified for further demonstration. In the practical application, the feedback positions and the corresponding compensation quantities are built in a compensation table. When the motor rotates at a constant speed, an ideal feedback pulse curve, which is an equal-slope line, is shown as a first feedback pulse curve Lp1 in FIG. 2B. In addition, a first feedback pulse Pt1, a second feedback pulse Pt2, and a third feedback pulse Pt3 can be obtained at t1, t2, and t3, respectively, and so on. Because the time interval is fixed, the pulse increment Pref can be calculated according to the slope of the first feedback pulse curve Lp1. In addition, the practical feedback pulse curve is shown as a second feedback pulse curve Lp2 due to the non-ideal characteristics of the analog sine and cosine signals. When the encoder produces a first encoding pulse $X(1)$ at the time interval of t0~t1, a first pre-treating compensation quantity $Pc(1)$ is obtained at the first feedback pulse Pt1. The first pre-treating compensation quantity $Pc(1)$ is calculated in that the first encoding pulse $X(1)$ is subtracted from the pulse increment Pref, namely, $Pc(1)=Pref-X(1)$. When the encoder produces a second encoding pulse $X(2)$ at the time interval of t1~t2, a second pre-treating compensation quantity $Pc(2)$ is obtained at the second feedback pulse Pt2. The second pre-treating compensation quantity $Pc(2)$ is calculated in that the second encoding pulse $X(2)$ is subtracted from the pulse increment Pref and then to sum up the first pre-treating compensation quantity $Pc(1)$, namely, $Pc(2)=Pc(1)+Pref-X(2)$. It means that the first pre-treating compensation quantity $Pc(1)$ needs to be accumulated when the second pre-treating compensation quantity $Pc(2)$ is calculated. Similarly, when the encoder produces a third encoding pulse $X(3)$ at the time interval of t2~t3, a third pre-treating compensation quantity $Pc(3)$ is obtained at the third feedback pulse Pt3. The third pre-treating compensation quantity $Pc(3)$ is calculated in that the third encoding pulse $X(3)$ is subtracted from the pulse increment Pref and then to sum up the second pre-treating compensation quantity $Pc(2)$, namely, $Pc(3)=Pc(2)+Pref-X(3)$. It means that the second pre-treating compensation quantity $Pc(2)$ needs to be accumulated when the third pre-treating compensation quantity $Pc(3)$ is calculated. By the same analogy, when the encoder produces a m-th encoding pulse X(m) at the time interval of t(m−1)~t(m), a m-th pre-treating compensation quantity Pc(m) is obtained at the m-th feedback pulse Pt(m). The m-th pre-treating compensation quantity Pc(m) is calculated in that the m-th encoding pulse X(m) is subtracted from the pulse increment Pref and then to sum up the (m−1)-th pre-treating compensation quantity Pc(m−1), namely, Pc(m)=Pc(m−1)+Pref−X(m). It means that the (m−1)-th pre-treating compensation quantity Pc(m−1) needs to be accumulated when the m-th pre-treating compensation quantity Pc(m) is calculated. In particular, the pulse increment Pref is a pulse difference between two feedback pulses of the first feedback pulse curve Lp1, namely, Pref=Pt1−Pt0=Pt2−Pt1=Pt3−Pt2. Therefore, the feedback pulses and the corresponding pre-treating compensation quantities, such as (Pt1, Pc(1)), (Pt2, Pc(2)), (Pt3, Pc(3)), . . . , (Pt(m), Pc(m)), can be obtained during the motor rotates at a constant speed, thus building the compensation table including feedback positions of the encoder to modify pulse errors of the different feedback positions.

In addition, the position interval judgment unit 20 is connected to the compensation quantity calculation unit 10 and receives the interval compensation quantity Pc(m) to judge the position interval of the interval compensation quantity Pc(m) according to the resolution of feedback positions of the encoder.

Figure 3:
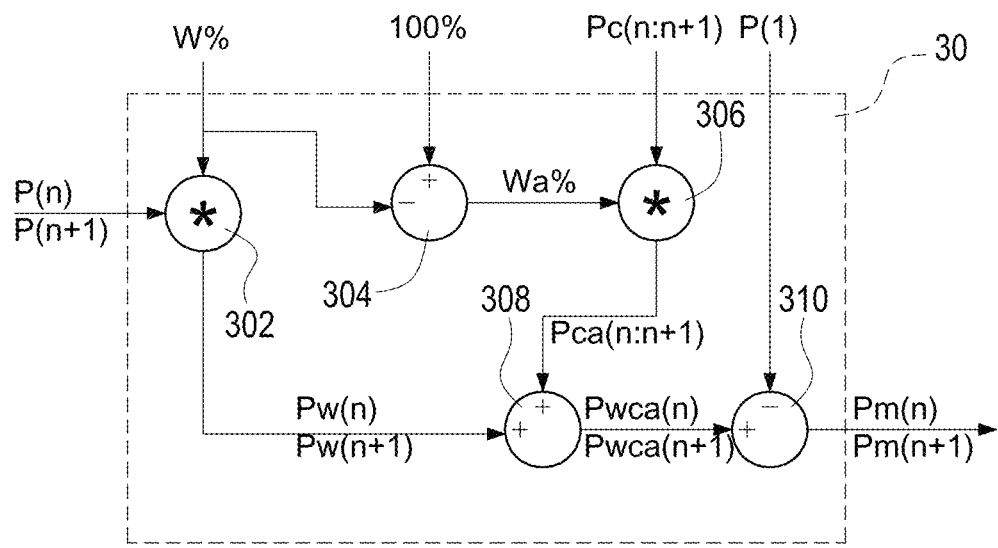
FIG. 3 is a block schematic view of a compensation quantity modification unit.

In addition, the compensation quantity modification unit 30 is connected to the position interval judgment unit 20. Reference is made to FIG. 3 which is a block schematic view of a compensation quantity modification unit. The compensation quantity modification unit 30 includes a third arithmetic unit 302, a fourth arithmetic unit 304, a fifth arithmetic unit 306, a sixth arithmetic unit 308, and a seventh arithmetic unit 310. In particular, the third arithmetic unit 302 and the fifth arithmetic unit 306 are a multiplication arithmetic unit, respectively. The fourth arithmetic unit 304, the sixth arithmetic unit 308, and the seventh arithmetic unit 310 are an addition/subtraction arithmetic unit, respectively.

The third arithmetic unit 302 receives a first compensation quantity P(n), a second compensation quantity P(n+1), and a weighting W % to multiply the first compensation quantity P(n) and the second compensation quantity P(n+1) by the weighting W % to produce a first weighting compensation quantity Pw(n) and a second weighting compensation quantity Pw(n+1), respectively. Namely, Pw(n)=P(n)×W % and Pw(n+1)=P(n+1)×W %. In particular, the first compensation quantity P(n) and the second compensation quantity P(n+1) are the original compensation quantities at the position interval corresponded to the interval compensation quantity Pc(m). The fourth arithmetic unit 304 receives the weighing W % and a value of 100% to subtract the weighting W % from the value of 100%, thus producing an auxiliary weighting Wa %. Namely, Wa %=(1−W %). The feedback compensation quantity Pc(n:n+1) is modified by using different weightings (namely, the weighting W % and the auxiliary weighting Wa %). That is, the compensation quantity of the compensation table is calculated by using a larger weighting (namely, the weighting W %), whereas the modified feedback compensation quantity is calculated by using a smaller weighting (namely, the auxiliary weighting Wa %), thus cumulating and substituting the compensation quantity of the corresponding feedback pulse in the compensation table. In particular, the weighting W % is larger than the auxiliary weighting Wa %, and the weighting is obtained through an empirical rule.

The fifth arithmetic unit 306 is connected to the fourth arithmetic unit 304 and receives the auxiliary weighting Wa % and a feedback compensation quantity Pc(n:n+1) of a position interval between the first compensation quantity P(n) and the second compensation quantity P(n+1), thus multiplying the feedback compensation quantity Pc(n:n+1) by the auxiliary weighting Wa % to produce a feedback weighting compensation quantity Pca(n:n+1). Namely, Pca(n:n+1)=Pc(n:n+1)×Wa %. The sixth arithmetic unit 308 is connected to the third arithmetic unit 302 and the fifth arithmetic unit 306. In addition, the sixth arithmetic unit 308 receives the first weighting compensation quantity Pw(n), the second weighting compensation quantity Pw(n+1), and the feedback weighting compensation quantity Pca(n:n+1) to sum up the first weighting compensation quantity Pw(n) and the feedback weighting compensation quantity Pca(n:n+1) to produce a first compositing compensation quantity Pwca(n), and to sum up the second weighting compensation quantity Pw(n+1) and the feedback weighting compensation quantity Pca(n:n+1) to produce a second compositing compensation quantity Pwca(n+1). Namely, Pwca(n)=Pw(n)+Pca(n:n+1) and Pwca(n+1)=Pw(n+1)+Pca(n:n+1). The seventh arithmetic unit 310 is connected to the sixth arithmetic unit 308 and receives the first compositing compensation quantity Pwca(n), the second compositing compensation quantity Pwca(n+1), and an initial compensation quantity P(1) to subtract the initial compensation quantity P(1) from the first compositing compensation quantity Pwca(n) to produce a first modification compensation quantity Pm(n), and to subtract the initial compensation quantity P(1) from the second compositing compensation quantity Pwca(n+1) to produce a second modification compensation quantity Pm(n+1). Namely, Pm(n)=Pwca(n)−P(1) and Pm(n+1)=Pwca(n+1)−P(1).

Accordingly, the compensation quantity calculation unit 10 is used to calculate the compensation quantity of feedback positions of the encoder, namely, the interval compensation quantity Pc(m) is obtained. Afterward, the position interval judgment unit 20 is used to determine the position interval of the interval compensation quantity Pc(m), namely, the feedback compensation quantity Pc(n:n+1) is obtained. Finally, the compensation quantity modification unit 30 is used to modify the feedback compensation quantity Pc(n:n+1) by using different weightings (namely, the weighting W % and the auxiliary weighting Wa %), thus obtaining the first modification compensation quantity Pm(n) and the second modification compensation quantity Pm(n+1). Therefore, the first modification compensation quantity Pm(n) and the second modification compensation quantity Pm(n+1) are modified by an iteration calculation rather than directly substituting the first compensation quantity P(n) and the second compensation quantity P(n+1) by the feedback compensation quantity Pc(n:n+1). Accordingly, an error between the feedback position and an ideal position is in an acceptable region, thus increasing accuracy of the feedback position compensation of the encoder.

According to the above-mentioned description, the first modification compensation quantity Pm(n) and the second modification compensation quantity Pm(n+1) are calculated as follows:

$$Pm(n)=P(n)\times W\%+Pc(n:n+1)\times(1-W\%)-P(1); \quad \text{(formula 1)}$$

$$Pm(n+1)=P(n+1)\times W\%+Pc(n:n+1)\times(1-W\%)-P(1); \quad \text{(formula 2)}$$

Where the term n is the index of the feedback position, namely, P(n=1) means the compensation quantity of the first feedback pulse Pt1. Similarly, P(n=2) means the compensation quantity of the second feedback pulse Pt2, and so on. The feedback compensation quantity Pc(n:n+1) means the compensation quantity that is between the n-th feedback pulse Pt(n) and the (n+1)-th feedback pulse Pt(n+1). In particular, the compensation quantity of the compensation table is modified by using a weighting iteration calculation. The first compensation quantity P(n) and the second compensation quantity P(n+1) of the compensation table are calculated by using a larger weighting (namely, the weighting W %), whereas the modified feedback compensation quantity Pc(n:n+1) is calculated by using a smaller weighting (namely, the auxiliary weighting Wa %). Therefore, the compensation quantity of the compensation table will much more accurate when the numbers of iteration increases. The detailed description of modifying the feedback compensation quantity by the compensation quantity modification unit 30 will be made hereinafter.

We assume that the compensation period of the feedback pulse is 20,000 scales. In particular, an initial feedback pulse Pt0 is 0 scale and the pulse interval is 625 scales. Hence, a series of feedback pulses can be obtained. Namely, the first feedback pulse Pt1 is 625 scales, the second feedback pulse Pt2 is 1,250 scales, the third feedback pulse Pt3 is 1,875 scales, and so on. In this example, the maximum number of the feedback pulse during a compensation period is 32, namely, 20,000/625=32. However, this example is for demonstration and not for limitation of the present invention. In particular, the maximum number of the feedback pulse is determined according to the interval of the feedback pulse. That is, the maximum number of the feedback pulse increases when the interval of the feedback pulse decreases (namely, the resolution of the feedback pulse increases). In this example, if the interval of the feedback pulse decreases to 125 scales, the maximum number of the feedback pulse will increase to 160. In addition, the weighting W % and the auxiliary weighting Wa % are respectively assigned as 80% and 20% to further demonstrate the present invention.

Figure 4A:
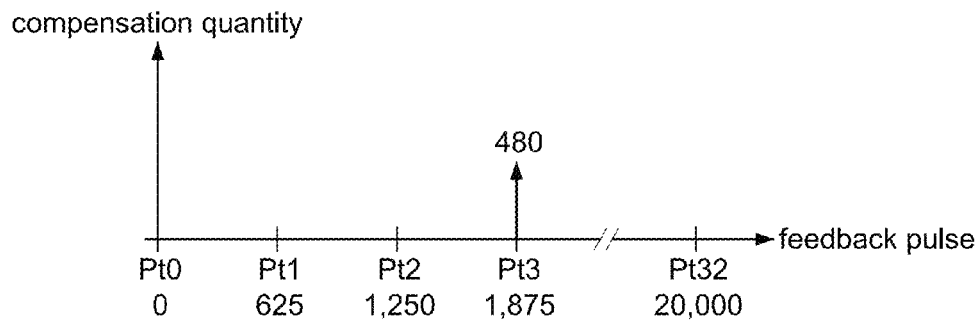
FIG. 4A is a first status schematic view of modifying the compensation quantity by the compensation quantity modification unit.

We assume that the original compensation quantities at the first feedback pulse Pt1, the second feedback pulse Pt2, and the third feedback pulse Pt3 are 0, 0, and 480, respectively. (In addition, the original compensation quantities at other remained feedback pulses Pt4~Pt32 are zero.) Thus, the initial status (#0) of the compensation table is shown as the following table 1. Reference is made to FIG. 4A which is a first status schematic view of modifying the compensation quantity by the compensation quantity modification unit 30.

TABLE 1

| | status #0 | | | | |
|---|---|---|---|---|---|
| | initial feedback pulse Pt0 | 1st feedback pulse Pt1 | 2nd feedback pulse Pt2 | 3th feedback pulse Pt3 | 32th feedback pulse Pt32 |
| compensation quantity | 0 | 0 | 0 | 480 | ... | 0 |

We assume that a feedback pulse is between the first feedback pulse Pt1 and the second feedback pulse Pt2 (namely, between 625 scales and 1,250 scales), and the feedback compensation quantity Pc(n:n+1) is 1,200. Hence, the first modification compensation quantity Pm(n) and the second modification compensation quantity Pm(n+1) can be calculated according to the formula 1 and the formula 2 as follows:

The first modification compensation quantity Pm(n)=0× 0.8+1,200×(1−0.8)=240;

The second modification compensation quantity Pm(n+1)=0×0.8+1,200×(1−0.8)=240.

Figure 4B:
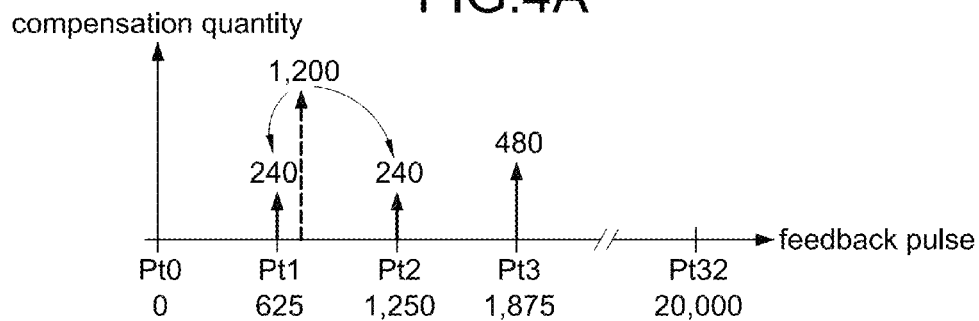
FIG. 4B is a second status schematic view of modifying the compensation quantity by the compensation quantity modification unit.

That is, the feedback compensation quantity Pc(n:n+1) does not directly substitute the first compensation quantity P(n) and the second compensation quantity P(n+1), but rather the feedback compensation quantity Pc(n:n+1) is modified by using different weightings (namely, the weighting W % and the auxiliary weighting Wa %) to obtain the first modification compensation quantity Pm(n) and the second modification compensation quantity Pm(n+1), thus substituting the compensation quantity of the corresponding feedback pulse. In this example, therefore, the modified compensation quantities of the first feedback pulse Pt1 and the second feedback pulse Pt2 increase 240, respectively. Thus, the first modification status (#1) of the compensation table is shown as the following table 2. Reference is made to FIG. 4B which is a second status schematic view of modifying the compensation quantity by the compensation quantity modification unit 30.

TABLE 2

| | status #1 | | | | |
|---|---|---|---|---|---|
| | initial feedback pulse Pt0 | 1st feedback pulse Pt1 | 2nd feedback pulse Pt2 | 3th feedback pulse Pt3 | 32th feedback pulse Pt32 |
| compensation quantity | 0 | 240 | 240 | 480 | ... | 0 |

Afterward, we assume that another feedback pulse is between the first feedback pulse Pt1 and the second feedback pulse Pt2 (namely, between 625 scales and 1,250 scales), and the feedback compensation quantity Pc(n:n+1) is 1,000. Hence, the first modification compensation quantity Pm(n) and the second modification compensation quantity Pm(n+1) can be calculated according to the formula 1 and the formula 2 as follows:

The first modification compensation quantity Pm(n)=240× 0.8+1,000×(1−0.8)=392;

The second modification compensation quantity Pm(n+1)=240×0.8+1,000×(1−0.8)=392.

Figure 4C:
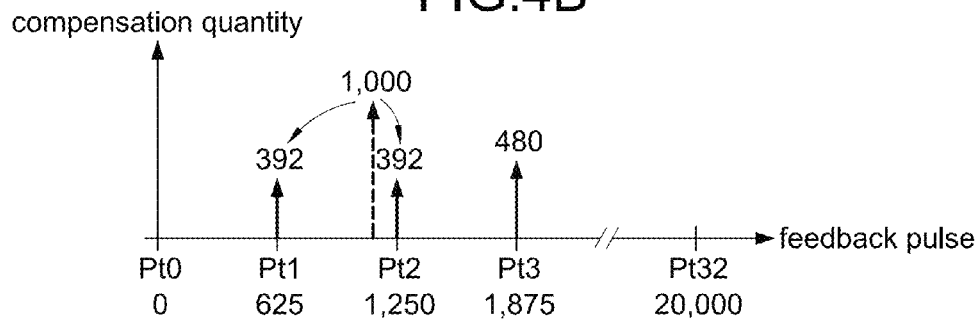
FIG. 4C is a third status schematic view of modifying the compensation quantity by the compensation quantity modification unit.

In this example, therefore, the modified compensation quantities of the first feedback pulse Pt1 and the second feedback pulse Pt2 increase 392, respectively. Thus, the second modification status (#2) of the compensation table is shown as the following table 3. Reference is made to FIG. 4C which is a third status schematic view of modifying the compensation quantity by the compensation quantity modification unit 30.

TABLE 3

| | status #2 | | | | |
|---|---|---|---|---|---|
| | initial feedback pulse Pt0 | 1st feedback pulse Pt1 | 2nd feedback pulse Pt2 | 3th feedback pulse Pt3 | 32th feedback pulse Pt32 |
| compensation quantity | 0 | 392 | 392 | 480 | ... | 0 |

Afterward, we assume that another feedback pulse is between the second feedback pulse Pt2 and the third feedback pulse Pt3 (namely, between 1,250 scales and 1,875 scales), and the feedback compensation quantity Pc(n:n+1) is 1,000. Hence, the first modification compensation quantity Pm(n)

and the second modification compensation quantity Pm(n+1) can be calculated according to the formula 1 and the formula 2 as follows:

The first modification compensation quantity Pm(n)=392× 0.8+1,000×(1−0.8)=513.6;

The second modification compensation quantity Pm(n+ 1)=480×0.8+1,000×(1−0.8)=584.

Figure 4D:
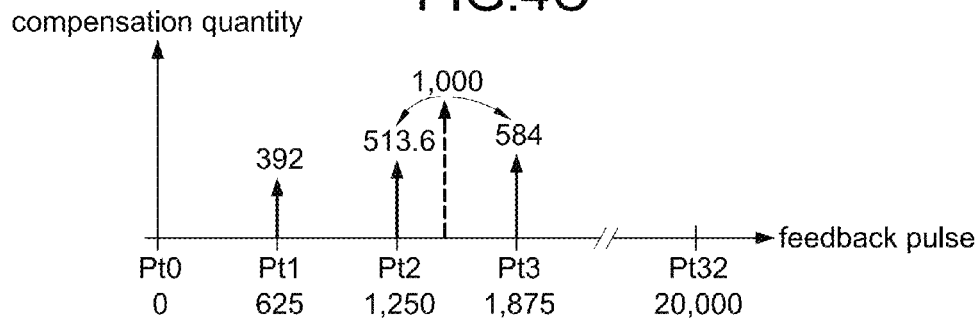
FIG. 4D is a fourth status schematic view of modifying the compensation quantity by the compensation quantity modification unit.

In this example, therefore, the modified compensation quantities of the second feedback pulse Pt2 and the third feedback pulse Pt3 increase 513.6 and 584, respectively. Thus, the third modification status (#3) of the compensation table is shown as the following table 4. Reference is made to FIG. 4D which is a fourth status schematic view of modifying the compensation quantity by the compensation quantity modification unit 30.

TABLE 4

| | status #3 | | | |
|---|---|---|---|---|
| initial feedback pulse Pt0 | 1st feedback pulse Pt1 | 2nd feedback pulse Pt2 | 3th feedback pulse Pt3 | 32th feedback pulse Pt32 |
| compensation quantity 0 | 392 | 513.6 | 584 | 0 |

Accordingly, the original compensation quantity of the compensation table is on-line modified by using the weighting iteration calculation to converge the errors the feedback pulse corresponding to the feedback pulses Pt0~Pt2, thus increasing accuracy of the feedback position compensation of the encoder. In this example, in particular, because the compensation period of the feedback pulse is 20,000 scales, the compensation quantity of the next feedback pulse of the 32nd feedback pulse Pt32 (namely, the 33rd feedback pulse Pt33) equals that of the initial feedback pulse Pt0. Also, the compensation quantity of the next two feedback pulse of the 32nd feedback pulse Pt32 (namely, the 34th feedback pulse Pt34) equals that of the first feedback pulse Pt1, and so on. In this example, therefore, the modification of the complete feedback pulse of the encoder, namely, the encoder rotates one turn, can be achieved through the periodic compensation quantity of the 20,000-scale feedback pulse.

Figure 5A:
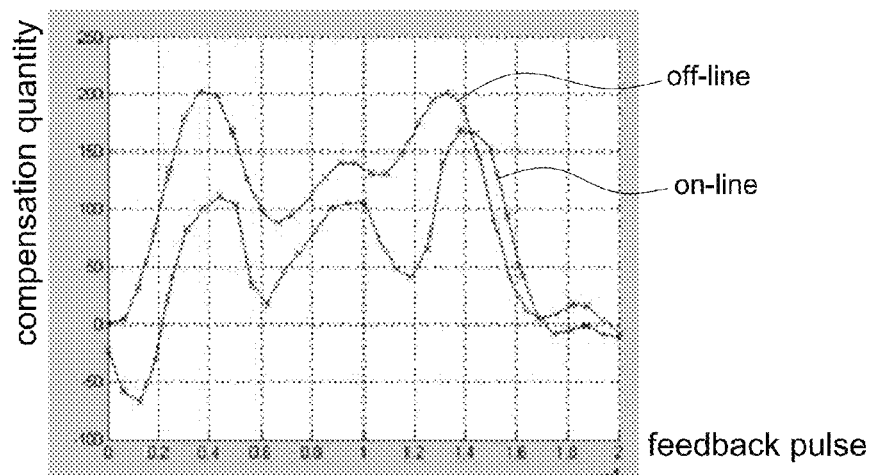
FIG. 5A is a waveform chart of comparing an off-line compensation quantity to an on-line modification compensation quantity produced by the compensation quantity modification unit (including offset quantity)

Reference is made to FIG. 5A which is a waveform chart of comparing an off-line compensation quantity to an on-line modification compensation quantity produced by the compensation quantity modification unit (including offset quantity). The abscissa represents the feedback pulse and the ordinate represents the compensation quantity. In particular, the weighting W % of the compensation quantity modification unit 30 equals 80%. There are two curves are shown in FIG. 5A, one is on-line simulation curve and the other is off-line simulation curve. Also, the feedback pulse interval of the abscissa is between 0 scale and 20,000 scales. In particular, there is an offset quantity is between the on-line curve and the off-line curve. In this example, therefore, the first modification compensation quantity Pm(n) and the second modification compensation quantity Pm(n+1) are calculated as follows:

$$Pm(n)=P(n)\times W\%+Pc(n:n+1)\times(1-W\%);$$ (formula 3)

$$Pm(n+1)=P(n+1)\times W\%+Pc(n:n+1)\times(1-W\%);$$ (formula 4)

Figure 5B:
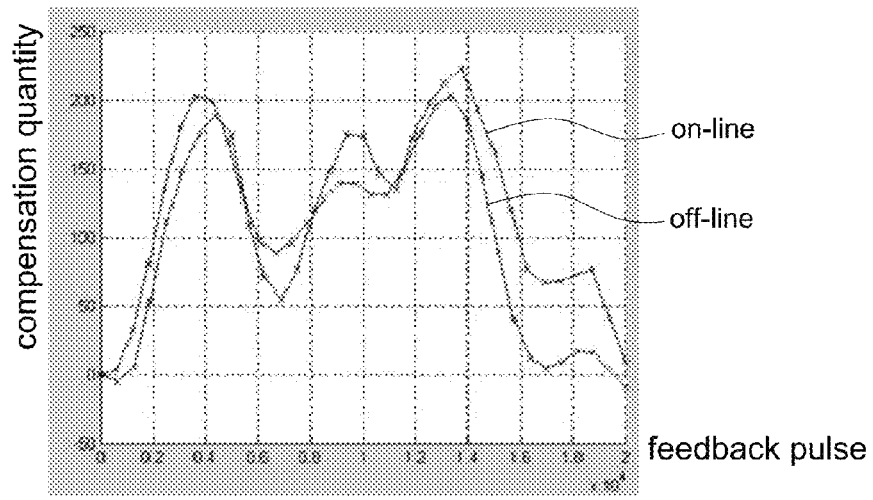
FIG. 5B is a waveform chart of comparing the off-line compensation quantity to the on-line modification compensation quantity produced by the compensation quantity modification unit (without including offset quantity)

The major difference between the formula 3 and the formula 1 (and the formula 4 and the formula 2) is the initial compensation quantity P(1). When the formula 3 and the formula 4 both subtract the initial compensation quantity P(1), FIG. 5B is varied from FIG. 5A. Reference is made to FIG. 5B which is a waveform chart of comparing the off-line compensation quantity to the on-line modification compensation quantity produced by the compensation quantity modification unit (without including offset quantity). Obviously, the offset quantity between the on-line curve and the off-line curve in FIG. 5B is smaller than that in FIG. 5A. In addition, the compensation quantities of the initial feedback pulse Pt0 and the 32th feedback pulse Pt32 of the on-line curve are near zero.

Figure 5C:
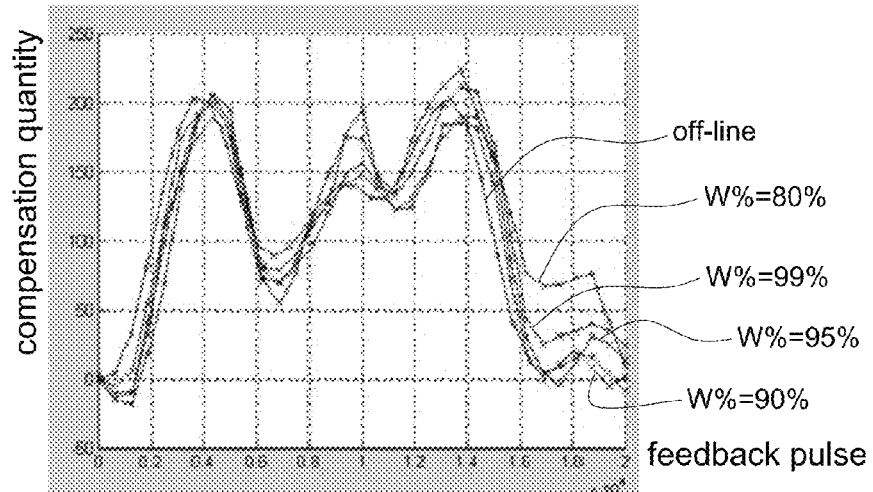
FIG. 5C is a waveform chart of comparing the off-line compensation quantity to the on-line modification compensation quantity with different weightings produced by the compensation quantity modification unit (without including offset quantity)

In addition, the weighting W % can be adjusted to modify the feedback compensation quantity. Reference is made to FIG. 5C which is a waveform chart of comparing the off-line compensation quantity to the on-line modification compensation quantity with different weightings produced by the compensation quantity modification unit (without including offset quantity). As shown in FIG. 5C, the weighting W % of the on-line curve is adjusted to 80%, 90%, 95%, and 99%, respectively. Obviously, the on-line curve is close to the off-line curve as the weighting W % gets larger, thus increasing accuracy of the feedback position compensation of the encoder.

Figure 6:
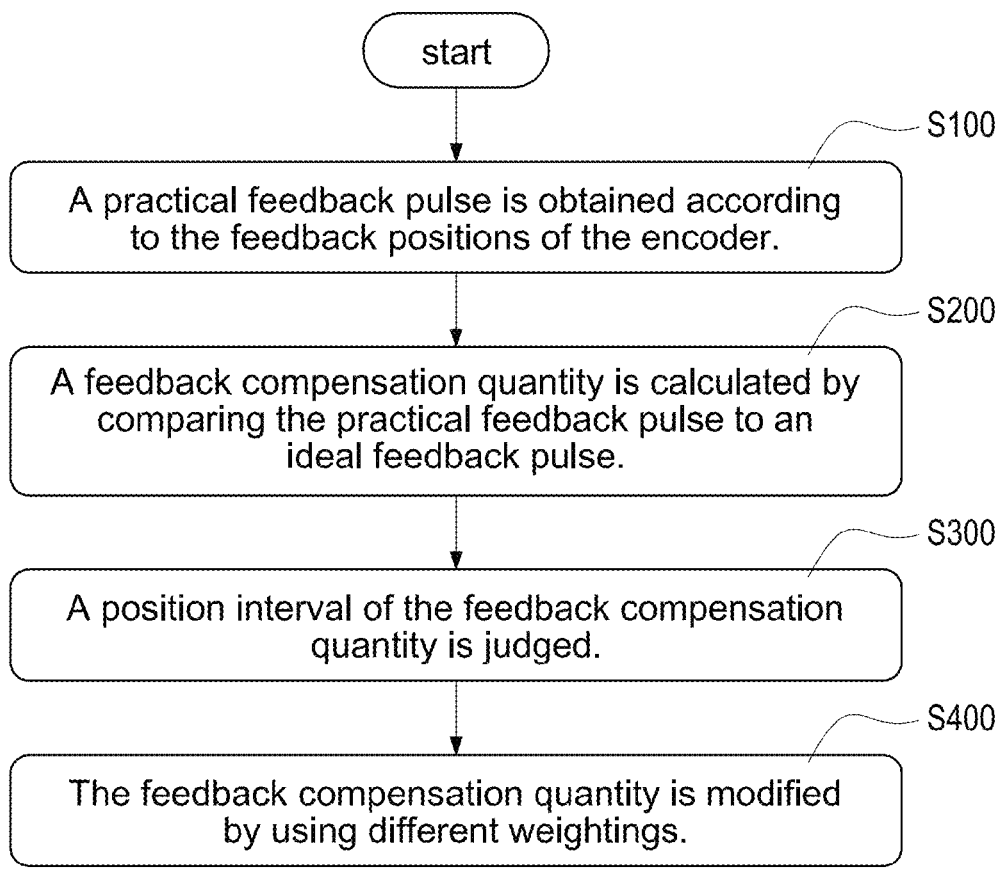
FIG. 6 is a flowchart of an on-line compensating method for feedback positions of an encoder.

Reference is made to FIG. 6 which is a flowchart of an on-line compensating method for feedback positions of an encoder. First, a practical feedback pulse is obtained according to the feedback positions of the encoder (S100). Afterward, a feedback compensation quantity is calculated by comparing the practical feedback pulse to an ideal feedback pulse S200). In particular, the ideal feedback pulse is obtained according the constant rotating speed of the motor. Afterward, a position interval of the feedback compensation quantity is judged (S300). Finally, the feedback compensation quantity is modified by using different weightings (S400). In particular, the compensation quantity of the compensation table is calculated by using a larger weighting, whereas the modified feedback compensation quantity is calculated by using a smaller weighting, thus cumulating and substituting the compensation quantity of the corresponding feedback pulse in the compensation table.

In conclusion, the present invention has following advantages:

1. As the motor is driven to rotate at a constant speed, the on-line compensation apparatus can be used to modify feedback positions of the encoder;

2. The on-line compensation can re-correct the feedback position of the encoder;

3. The user can operate only one driver without using other special equipment and software to implement the on-line compensation of feedback positions of the encoder;

4. Comparing to the off-line compensation, the on-line compensation can be conveniently used to only modify the algorithm of the program without modifying the hardware circuit so as to significantly increase flexibility of the system and reduce costs;

5. When the encoder installs on the motor and the driver drives the motor, the calculated compensation quantity can be loaded in the compensation table of the encoder; and 6. The feedback compensation data can be also stored in the driver so that the driver can implement the modification of the feedback compensation alone even if the encoder does not have the position-compensation function.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An on-line compensation apparatus for feedback positions of an encoder, the on-line compensation apparatus applied to a motor driven to rotate at a constant speed by a driver, thus compensating the errors of feedback positions of the encoder; the on-line compensation apparatus comprising:
 a compensation quantity calculation unit, comprising:
  a first arithmetic unit receiving a pre-treating compensation quantity and a pulse increment to sum up the pre-treating compensation quantity and the pulse increment; and
  a second arithmetic unit connected to the first arithmetic unit and receiving an encoding pulse to subtract the encoding pulse from the sum of the pre-treating compensation quantity and the pulse increment, thus producing an interval compensation quantity;
 a position interval judgment unit connected to the compensation quantity calculation unit and receiving the interval compensation quantity to judge the position interval of the interval compensation quantity according to the resolution of feedback positions of the encoder; and
 a compensation quantity modification unit connected to the position interval judgment unit, comprising:
  a third arithmetic unit receiving a first compensation quantity, a second compensation quantity, and a weighting to multiply the first compensation quantity and the second compensation quantity by the weighting to produce a first weighting compensation quantity and a second weighting compensation quantity, respectively;
  a fourth arithmetic unit receiving the weighting and a value of 100% to subtract the weighting from the value of 100%, thus producing an auxiliary weighting;
  a fifth arithmetic unit connected to the fourth arithmetic unit and receiving the auxiliary weighting and a feedback compensation quantity of a position interval between the first compensation quantity and the second compensation quantity to multiply the feedback compensation quantity by the auxiliary weighting to produce a feedback weighing compensation quantity;
  a sixth arithmetic unit connected the third arithmetic unit and the fifth arithmetic unit and receiving the first weighting compensation quantity, the second weighing compensation quantity, and the feedback weighting compensation quantity to sum up the first weighting compensation quantity and the feedback weighting compensation quantity to produce a first compositing compensation quantity, and to sum up the second weighting compensation quantity and the feedback weighting compensation quantity to produce a second compositing compensation quantity; and
  a seventh arithmetic unit connected to the sixth arithmetic unit and receiving the first compositing compensation quantity, the second compositing compensation quantity, and an initial compensation quantity to subtract the initial compensation quantity from the first compositing compensation quantity to produce a first modification compensation quantity, and to subtract the initial compensation quantity from the second compositing compensation quantity to produce a second modification compensation quantity;
 whereby the first modification compensation quantity and the second modification compensation are cumulated by an iteration calculation to achieve that an error between the feedback position and an ideal position is in an acceptable region, thus increasing accuracy of the feedback position compensation of the encoder.

2. The on-line compensation apparatus in claim 1, wherein the first arithmetic unit is an addition arithmetic unit having two input terminals and one output terminal, the two input terminals receive the pre-treating compensation quantity and the pulse increment, the output terminal outputs the sum of the pre-treating compensation quantity and the pulse increment; the second arithmetic unit is a subtraction arithmetic unit having two input terminals and one output terminal, the two input terminals receive the sum of the pre-treating compensation quantity and the pulse increment and the encoding pulse, the output terminal outputs the interval compensation quantity.

3. The on-line compensation apparatus in claim 1, wherein the third arithmetic unit and the fifth arithmetic unit are a multiplication arithmetic unit, respectively.

4. The on-line compensation apparatus in claim 1, wherein the fourth arithmetic unit is a subtraction arithmetic unit having two input terminals and one output terminal, the two input terminals receive the weighting and the value of 100%, the output terminal outputs the auxiliary weighting; the sixth arithmetic unit is an addition arithmetic unit having three input terminals and one output terminal, the three input terminals receive the first weighting compensation quantity, the second weighing compensation quantity, and the feedback weighting compensation quantity, the output terminal outputs the first compositing compensation quantity and the second compositing compensation quantity; the seventh arithmetic unit is a subtraction arithmetic unit having three input terminals and one output terminal, the three input terminals receive the first compositing compensation quantity, the second compositing compensation quantity, and the initial compensation quantity, the output terminal outputs the first modification compensation quantity and the second modification compensation quantity.

5. The on-line compensation apparatus in claim 1, wherein the pulse increment is a pulse difference between two feedback pulses of the ideal feedback pulse.

6. The on-line compensation apparatus in claim 1, wherein the encoding pulse is a position compensation quantity produced by the encoder at the corresponding time interval.

7. The on-line compensation apparatus in claim 1, wherein the first compensation quantity and the second compensation quantity are the original compensation quantities at the position interval corresponded to the interval compensation quantity.

8. The on-line compensation apparatus in claim 1, wherein the interval compensation quantities and the corresponding positions of the interval compensation quantities are built in a compensation table.

9. The on-line compensation apparatus in claim 1, wherein the weighing is obtained through an empirical rule.

10. The on-line compensation apparatus in claim 1, wherein the weighting is larger than the auxiliary weighting.

* * * * *